United States Patent [19]

Hutchison

[11] Patent Number: 5,416,698
[45] Date of Patent: May 16, 1995

[54] INPUT SHAFT OVERSPEED WARNING SYSTEM

[75] Inventor: Ronald A. Hutchison, Portage, Mich.

[73] Assignee: Eaton Corporation, Cleveland, Ohio

[21] Appl. No.: 88,025

[22] Filed: Jul. 9, 1993

[51] Int. Cl.⁶ .................................... G06F 15/50
[52] U.S. Cl. ............................ 364/424.1; 364/424.01;
    477/120; 477/124; 477/125; 192/3.63; 192/3.3;
    192/3.31; 74/335; 74/336 R
[58] Field of Search ........... 364/424.1, 424.01, 431.01,
    364/431.11, 426.04, 431.07; 74/366 R, 858, 866,
    872, 874, 812, 335, 745; 192/0.092, 0.076, 0.033,
    0.084, 0.075, 0.052, 0.044, 0.096, 0.08, 3.3, 3.63,
    13 R; 477/175, 77, 78, 125, 124, 904, 122, 120;
    475/158

[56] References Cited

U.S. PATENT DOCUMENTS

| | | | |
|---|---|---|---|
| 4,024,937 | 5/1977 | Hoepfl et al. | 192/13 R |
| 4,286,324 | 8/1981 | Ingram | 364/431.01 |
| 4,361,060 | 11/1982 | Smyth | 364/424.1 |
| 4,442,224 | 4/1984 | Shirasaki et al. | 364/431.11 |
| 4,463,427 | 7/1984 | Bonnetain et al. | 364/424.1 |
| 4,648,290 | 3/1987 | Dunkley et al. | 192/0.092 |
| 4,714,144 | 12/1987 | Sperenza | 364/424.1 |
| 4,754,665 | 7/1988 | Vandervoort | 74/745 |
| 4,788,889 | 12/1988 | Davis et al. | 74/745 |
| 4,831,894 | 5/1989 | Braun | 74/745 |
| 4,873,637 | 10/1989 | Braun | 364/424.1 |
| 4,920,815 | 5/1990 | Reynolds | 74/335 |
| 4,964,313 | 10/1990 | Davis | 74/331 |
| 4,966,048 | 10/1990 | Braun | 74/745 |
| 4,989,706 | 2/1991 | Morscheck | 192/53 |
| 5,141,087 | 8/1992 | Reynolds | 192/53 |
| 5,199,314 | 4/1993 | Hutchison | 74/335 |
| 5,272,939 | 12/1993 | Markyvech et al. | 364/424.1 |
| 5,293,316 | 3/1994 | Slicker | 364/424.1 |

Primary Examiner—Kevin J. Teska
Assistant Examiner—Jacques H. Louis-Jacques
Attorney, Agent, or Firm—Howard D. Gordon

[57] ABSTRACT

A manually-shifted synchronized compound transmission (10) is provided with a relatively simple and inexpensive mechanism for warning the operator that an inappropriate gear ratio has been selected. Sensors (110, 112, 114) provide input signals (116) to a logic unit (118) indicative of the rotational speed of the transmission input shaft (118) and the logic unit will issue command signals (120) to an alarm member (122) if sensed input shaft speed is not within an acceptable range to warn the vehicle operator that reengagement of the vehicle master clutch (C) in the currently engaged ratio (GR) will result in undesirable overspeeding and/or underspeeding of the vehicle engine (E).

6 Claims, 2 Drawing Sheets

INPUT SHAFT OVERSPEED WARNING SYSTEM

BACKGROUND OF THE INVENTION

1. Field of the Invention

The present invention relates to a warning system for a manually shifted vehicular transmission to warn the vehicle operator that the input shaft is rotating at a speed that will result in overspeeding and/or underspeeding the engine upon engagement of the master clutch. In particular, the invention relates to a warning system for a compound synchronized manual transmission, such as a compound synchronized transmission having a splitter type input section and/or a range type output section, for warning that the transmission is engaged in a ratio which will result in overspeeding or underspeeding (stalling) the engine upon reengagement of the vehicle master clutch.

2. Description of the Prior Art

Manually shifted vehicular change gear transmissions, of both the simple and the compound type, are well known in the prior art as may be seen by reference to U.S. Pat. Nos. 3,105,395; 4,527,447 and 4,754,665, the disclosures of which are incorporated herein by reference.

Synchronized change gear transmissions, of both the simple and compound type, and synchronized jaw clutch assemblies therefor, are well known in the prior art as may be seen by reference to U.S. Pat. Nos. 4,462,489; 4,125,179; 4,440,037; 4,831,894; 4,989,706 and 5,141,087, the disclosures of which are incorporated herein by reference.

Compound transmissions having a splitter type input section are known in the prior art as may be seen by reference to the "Ecosplit" transmission manufactured by Zahnradfabrik Friedrichshafen Aktiengesbushaft and to above-mentioned U.S. Pat. No. 4,831,894.

While synchronized vehicular transmissions may be desirable as less skill is required to synchronize the jaw clutches thereof as compared to the jaw clutches of nonsynchronized mechanical transmissions, such transmission were not totally satisfactory as the synchronizers may allow engagement of a transmission ratio which, at current vehicle speed, will result in either overspeeding or underspeeding the engine if the master clutch is reengaged upon completion of the shift. This is an especially troublesome problem for compound transmissions wherein, at current vehicle speed, an overaggressive downshift can cause damaging overspeeding of the engine, and an overaggressive upshift can cause stalling underspeeding of the engine, upon reengagement of the master clutch upon completion of a engagement of an undesirable gear ratio.

SUMMARY OF THE INVENTION

In accordance with the present invention, the drawbacks of the prior art are minimized or overcome by the provision of a warning system for a manually shifted transmission, preferably a synchronized transmission, which will sense one or more inputs indicative of transmission input shaft rotational speed and will cause a warning to be issued if said input signals are indicative of an input shaft speed which exceeds a predetermined maximum reference value and/or is less than a predetermined minimum reference value. Preferably, the reference values are set for the particular engine utilized in the vehicle and the warning may be audible (buzzer, horn, etc.) and/or visual (illuminated and/or flashing warning light).

Accordingly, it is an object of the present invention to provide an improved synchronized vehicular transmission having an input shaft overspeed/underspeed warning system for warning that an inappropriate ratio has been engaged and reengagement of the master clutch will have undesirable effects on the vehicle engine.

These and other objects and advantages of the present invention will become apparent from a reading of the description of the preferred embodiment taken in connection with the drawings.

DESCRIPTION OF THE PREFERRED EMBODIMENT

Figure 1:
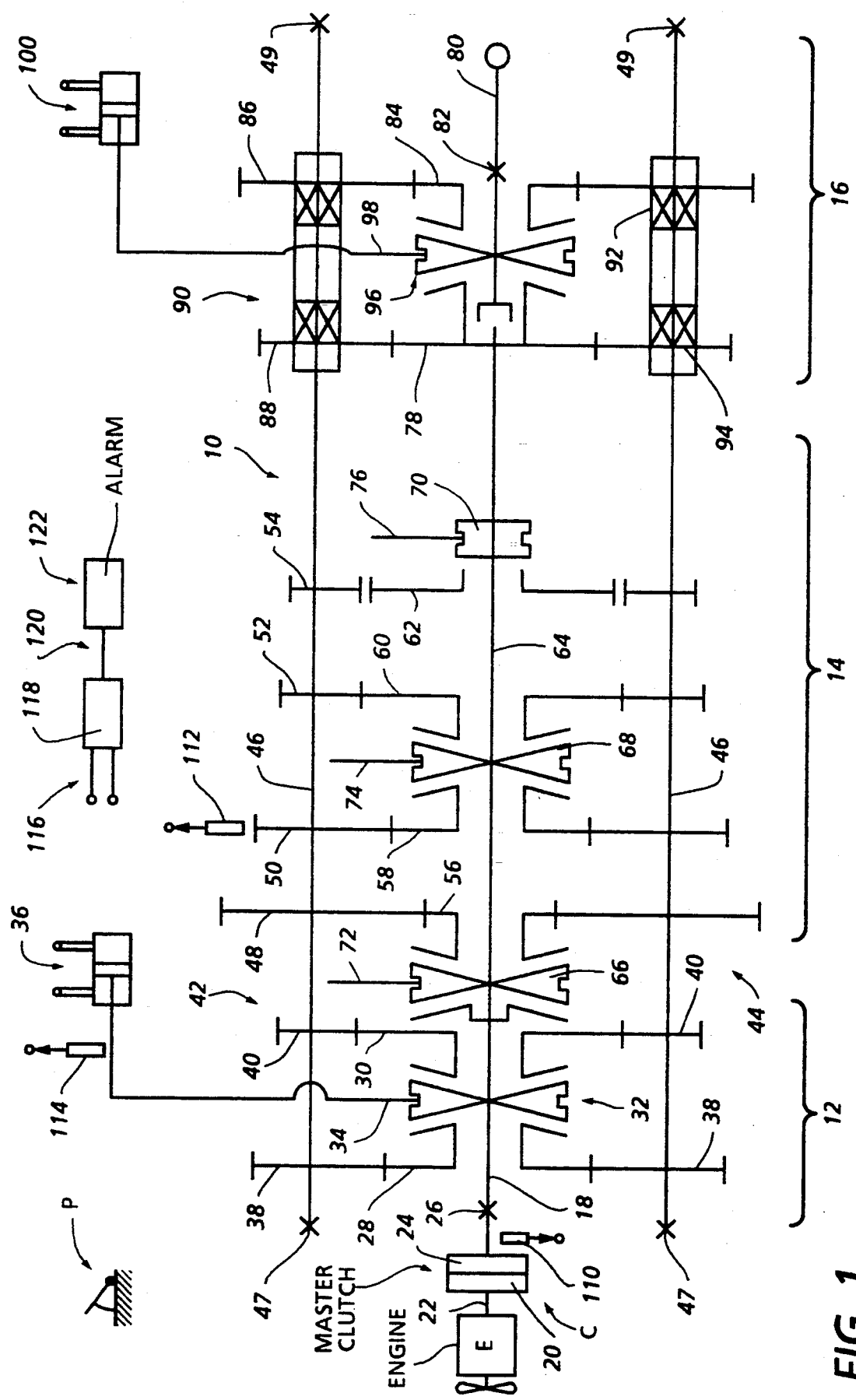
FIG. 1 is a schematic illustration of a compound synchronized transmission including the input shaft overspeed/underspeed system of the present invention.

Certain terminology will be used in the following description for convenience only and will not be limiting. The words "upwardly", "downwardly", "rightwardly" and "leftwardly" will designate directions in the drawings to which reference is made. The words "inwardly" and "outwardly" will refer to directions toward and away from, respectively, the geometric center of the device and designated parts thereof. Said terminology includes the words above specifically mentioned, derivatives thereof and words of similar import.

The term "compound transmission" is used to designate a change speed or change gear transmission having a main transmission section and one or more auxiliary transmission sections connected in series whereby the selected gear reduction in the main transmission section may be compounded by further selected gear reduction in the auxiliary transmission section or sections. The term "upshift" as used herein shall mean the shifting from a lower speed gear ratio into a higher speed gear ratio and the term "downshift" as used herein shall mean shifting from a higher speed gear ratio to a lower speed gear ratio. The term "low speed gear ratio" as used herein shall designate a gear ratio utilized for relatively lower forward speed operation in a transmission, i.e. a set of gears having a higher ratio of reduction of output shaft speed relative to the speed of the input shaft. "Synchronized jaw clutch assembly" and words of similar import shall designate a clutch assembly utilized to nonrotationally couple a selected gear to a shaft by means of a positive clutch in which attempted engagement of said clutch is prevented until the members of the clutch are at substantially synchronous rotation and relatively large capacity friction means are associated with the clutch members and are sufficient, upon initiation of a clutch engagement operation, to cause the clutch members and all members rotating therewith to rotate at a substantially synchronous speed.

Referring now to FIG. 1, there is schematically illustrated a synchronized compound transmission 10 comprising a synchronized splitter type input section 12, a synchronized main transmission section 14 connected in series therewith and a synchronized range type auxiliary section 16 connected in series with the main transmission section 14. Typically, transmission 10 is housed within a single housing and includes an input shaft 18 driven by a prime mover such as diesel engine E through a selectively disengaged, normally engaged master friction clutch C having an input or driving section 20 drivingly connected to the engine crank shaft 22 and a driven portion 24 rotatably fixed to the transmission input shaft 18. Preferably, engagement and disengagement of the master friction clutch C is controlled by a manual clutch pedal P. Clutch pedal P may operate the master friction clutch C by means of a mechanical linkage (not shown), or by other electric, hydraulic and/or pneumatic actuating mechanisms as is well known in the prior art.

In the splitter type input section 12, input shaft 18 is supported by bearing 26 and is surrounded by input gears 28 and 30, a selected one of which may be rotationally coupled to the input shaft 18 by means of double acting synchronized jaw clutch assembly 32. Synchronized jaw clutch assemblies, such as jaw clutch assembly 32 and the other synchronized jaw clutch assemblies utilized in transmission 10, are well known in the prior art and examples thereof may be seen by reference to U.S. Pat. Nos. 4,462,489; 4,125,179 and 2,667,955, the disclosures of all of which are hereby incorporated by reference. Preferably, the synchronized jaw clutch assemblies utilized in the present invention may be of the boosted type as is described in U.S. Pat. Nos. 5,161,423; 5,141,087; 5,111,922 and 5,103,952 and 5,092,438, the disclosures of all of which are hereby incorporated by reference.

Synchronized jaw clutch assembly 32 is urged rightwardly to clutch splitter input gear 30 to input shaft 18 or leftwardly to clutch splitter input gear 28 to input shaft 18 by means of a shift fork 34 controlled by a two-position cylinder/piston actuator 36.

Input gears 28 and 30 are constantly meshed with gears 38 and 40, respectively, carried by substantially identical countershaft assemblies 42 and 44, each including a main countershaft 46 to which the countershaft gears 38 and 40 are rotationally fixed.

The main countershafts 46 extend into the main transmission section 14 and each carries substantially identical countershaft gears 48, 50, 52 and 54 for rotation therewith which are constantly meshed wish, respectively, main shaft gears 56, 58, 60 and 62, respectively. The main shaft gears surround the main shaft 64, and are selectively clutchable thereto, one at a time, by means of double acting synchronized jaw clutch assemblies 66 and 68 and clash type jaw clutch member 70. Synchronized jaw clutch assemblies 66 and 68 may be substantially identical to jaw clutch assembly 32 while clash type jaw clutch member 70 is associated with the reverse mainshaft gear 62 which is constantly meshed with an idler gear (not shown) which, in turn, is constantly meshed with countershaft gear 54. Double acting synchronized jaw clutch assemblies 64 and 68 and nonsynchronized jaw clutch 70 are axially positioned by means of shift forks 72, 74 and 76, respectively, all of which may be associated with a manually controlled shift bar housing assembly as is well known in the prior art.

Main shaft 64 extends rearwardly into range type auxiliary section 16 and carries range section input gear 78 fixed for rotation therewith. An output shaft 80 extends outwardly from the range section and is supported in the transmission housing by means of bearing assembly 82. An output gear 84 surrounds the output shaft 80 and is constantly meshed with auxiliary section countershaft gear 86. Auxiliary section countershaft gear 86 and an auxiliary section countershaft gear 88, constantly meshed with range section input gear 78, are carded by range section countershafts 90 which are defined by a generally tubular body 92 supported on the main section countershafts 46 by means of bearings 94. A two-position, double-acting synchronized jaw clutch assembly 96, which is structurally and functionally similar to synchronized jaw clutch assembly 32, is provided for selectively coupling either main shaft 64 or output gear 84 to the output shaft 89. Jaw clutch assembly 96 is controlled by a shift fork member 98 operated by a two-position piston/cylinder actuator assembly 100.

Figure 2:
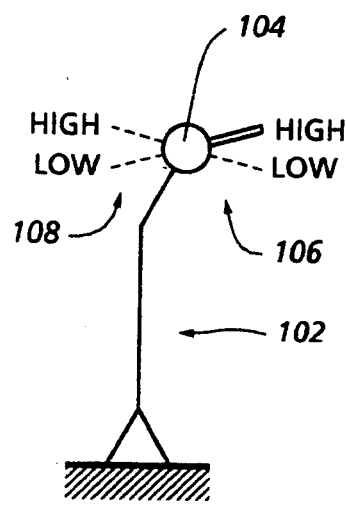
FIG. 2 is a schematic illustration of the shift lever for the transmission of FIG. 1.
Figure 3:
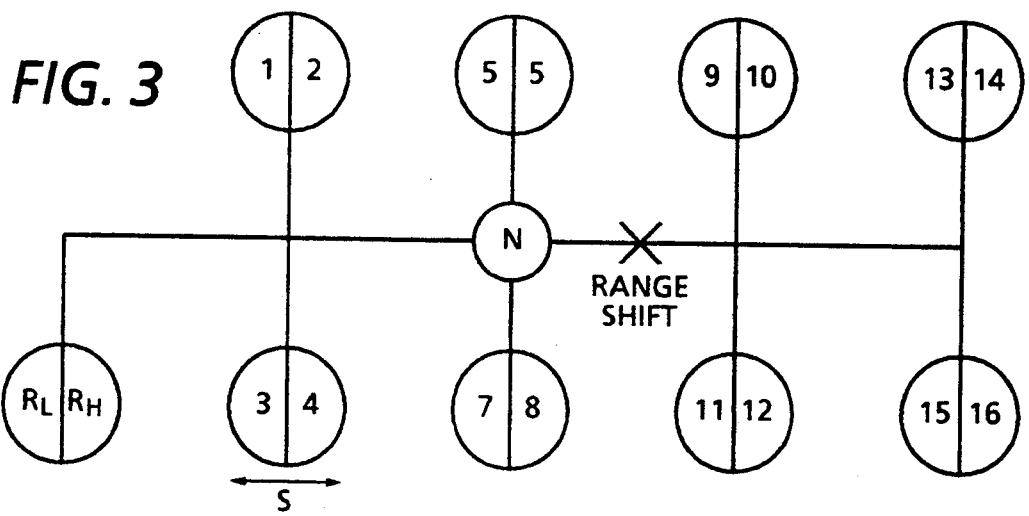
FIGS. 3 and 4 are schematic illustrations of shift patterns for the transmission of FIGS. 1 and 2.
Figure 4:
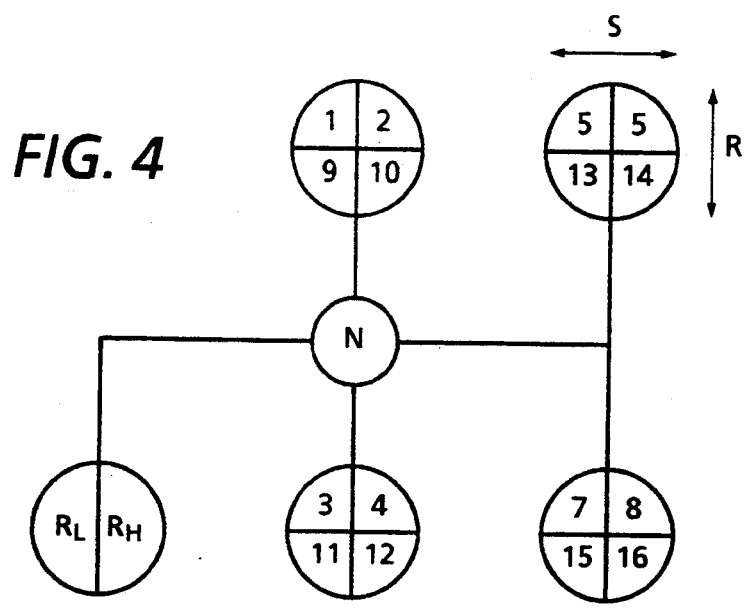

FIGS. 3 and 4, respectively, illustrate the "double H" and the "repeat H", respectively, shift patterns for transmission 10. Referring to FIG. 2, shift lever 102 is utilized to manipulate the shift bar housing assembly for controlling clutches 66, 68 and 70 in the main transmission section 14. Shift knob 104 will carry a first selector member 106 for controlling the pressurization and exhaust of the chambers of actuator 36 for selecting high-speed or low-speed operation of the input splitter 12. For "repeat H" type transmissions, a second selector 108 will be provided for controlling the operation of piston actuator 100 for selecting high-speed or low-speed operation of the range-type auxiliary section 16.

Compound transmissions of the range, splitter, and/or range/splitter type are well known in the prior art, as are the actuators and controls therefor as may be seen by reference to U.S. Pat. Nos. 4,754,665; 5,141,087 and 5,199,314, the disclosures of which are hereby incorporated by reference.

An advantage of synchronized transmissions over nonsynchronized transmissions is that engagement of the jaw clutches may be accomplished with a lower level of skill than is associated with shifting of nonsynchronized transmissions. A drawback, however, is that nonpermitted, inappropriate gear ratios, for existing vehicular conditions, may be engaged with a greater probability than is associated with nonsynchronized transmission which may result in dangerous, destructive, overspeeding of the vehicular engine and/or underspeeding of the engine which will result in stalling thereof.

As is well known, at full master clutch engagement, $ES=IS=OS \times GR$ where $ES=$Engine Speed, $IS=$Input Shaft Speed, $OS=$Output Shaft Speed (which is a direct function of vehicular ground speed) and $GR=$the gear ratio of the transmission taken as a whole. At a relatively high ground speed, therefore, at a relatively high output shaft speed, engagement of too low of a gear ratio and then reengagement of the master clutch will result in dangerous and/or destructive overspeeding of the engine. Similarly, engagement of too high of a gear ratio may result in underspeeding and stalling of the engine. The above is a special problem in a compound transmission wherein an error in engaged ratio may be compounded when both a main section and a range-type auxiliary section shift is involved.

Compound shifting of transmission 10 involving a shift in both the main section 14 and the range type auxiliary section 16 typically involves disengaging the master clutch C while the main and/or range type auxiliary section is shifted and then reengaging the master clutch upon completion of the shift. According to the present invention, a relatively simple and inexpensive mechanism is provided to protect the engine from inappropriate shifts. The present invention comprises sensing means for sensing parameters indicative of the rotational speed of the input shaft 18 and for comparing the speed signal to a maximum engine speed reference signal and/or a minimum engine speed reference signal and for issuing an alarm in the event that the sensed engine speed is not within allowable values. While a relatively simple input shaft speed sensor 110 may be utilized, in certain situations it is difficult to locate a sensor at the input shaft. In such situations, a sensor 112 which will sense the rotational speed of a member, such as gear 80, which rotates in a known manner relative to the rotation of input shaft 18 may be utilized. In the case of a two-speed input section, a second sensor 114 may be utilized to sense which of the input gears 28 or 30 is engaged to the input shaft to determine the ratio of rotational speeds of gear 80 and input shaft 18. The advantage of sensor 112 and 114 is that they may be easily incorporated into the transmission housing without requiring special insulation or attention by the vehicle assembler.

The input signals 116 from the sensors are received by a logic member 118 and are then calculated and compared to the engine reference speed values. Preferably, the reference speed values may be easily modified for the specifics of the engine E utilized in a particular vehicle. The logic element 118 may be microprocessor based and/or may comprise a subroutine of a multifunction onboard computer. Upon sensing that the sensed/calculated input shaft speed is not within allowable limits, the logic element will send a command output signal 120 to one or more alarm devices 122 to warn the operator that the master clutch should not be reengaged and that such reengagement may result in undesirable overspeeding and/or underspeeding of the vehicle engine. The alarm 122 may be an audible alarm such as a buzzer or a bell and/or a visual alarm such as a warning light or the like.

Accordingly, it may be seen that a relatively simple and inexpensive mechanism has been provided for warning a vehicle operator that an inappropriate transmission ratio has been engaged and that the vehicular engine may be undesirably overspeeded or underspeeded upon reengagement of the vehicle master clutch.

Although the present invention has been set forth with a certain degree of particularity, it is understood that various modifications are possible without departing from the spirit and the scope of the invention as hereinafter claimed.

I claim:

1. A manually shifted vehicular transmission system comprising:
    a manually shifted change gear transmission (10) having a multiple forward speed ratio main transmission section (14) connected in series with an auxiliary transmission section (12, 16), the auxiliary transmission section and the forward speed ratios of the main transmission section selectively engaged by means of synchronized jaw clutches, said transmission (10) having an input shaft (18) drivingly connected to a prime mover (E) by means of a manually operated selectively engaged and disengaged master friction clutch (C) and an output shaft (80) for driving connection to vehicle drive wheels;
    manually operated shifting means (102) for manually engaging and disengaging the synchronized jaw clutches in at least said main transmission section;
    manually operated clutch actuator means (P) for manually engaging and disengaging said master friction clutch;
    sensor means (110/112 and 114) for providing input signals indicative of rotational speed of said input shaft;
    logic means (118) for receiving said input signals and comparing said input signals to predetermined reference values to determine if the rotational speed of said input shaft is an acceptable value or is not an acceptable value and for issuing command output signals (120) if the rotational speed of said input shaft is not an acceptable value; and
    alarm means (122) responsive to said command output signals from said logic unit for providing an alarm signal.

2. The system of claim 1 wherein said alarm means provides an audible alarm signal.

3. The system of claim 1 wherein said alarm means provides a visual alarm signal.

4. The system of claim 1 wherein said alarm means provides an audible and a visual alarm signal.

5. The system of claim 1 wherein said prime mover is a fuel controlled engine having known characteristics and said reference values are selected as a function of said known characteristics.

6. The transmission system of claims 1, 2, 3, 4 or 5 wherein said transmission comprises an input splitter section (12) connected in series with a multiple-speed main transmission section (14) and said sensing means comprises a sensor (114) for providing an input signal indicative of the engaged ratio of said input splitter section and a second sensor means (112) for providing a signal indicative of the rotational speed of a member located in said main transmission section.

* * * * *